United States Patent [19]

Blizzard et al.

[11] Patent Number: 4,831,080
[45] Date of Patent: May 16, 1989

[54] CROSSLINKABLE PRESSURE-SENSITIVE ADHESIVES CONTAINING A LIQUID ORGANOHYDROGENPOLYSILOXANE

[75] Inventors: John D. Blizzard, Bay City; Terence J. Swihart, Essexville, both of Mich.

[73] Assignee: Dow Corning Corporation, Midland, Mich.

[21] Appl. No.: 189,004

[22] Filed: May 2, 1988

[51] Int. Cl.$^4$ ................................................. C08F 8/00
[52] U.S. Cl. ..................................... 525/100; 525/104; 525/105; 525/106; 525/440; 525/446; 525/454; 525/460; 156/310; 428/420
[58] Field of Search ............... 525/100, 104, 105, 106, 525/440, 446, 454, 460; 428/420; 156/310

[56] References Cited

U.S. PATENT DOCUMENTS

| | | | |
|---|---|---|---|
| 2,814,601 | 11/1957 | Currie et al. | 260/29.1 |
| 3,644,245 | 2/1972 | Flanagan et al. | 260/23 |
| 3,657,379 | 4/1972 | Hilbelink et al. | 260/824 |
| 3,707,518 | 12/1972 | Bemmels et al. | 260/29.6 |
| 3,983,298 | 9/1976 | Hahn et al. | 428/355 |
| 4,126,504 | 11/1978 | Wolinski et al. | 156/310 |
| 4,151,319 | 4/1979 | Sackoff et al. | 428/40 |
| 4,322,518 | 3/1982 | Blizzard | 528/15 |
| 4,332,844 | 6/1982 | Hamada et al. | 427/387 |
| 4,423,095 | 12/1983 | Blizzard | 525/60 |
| 4,463,115 | 7/1984 | Hirose et al. | 524/188 |
| 4,500,584 | 2/1985 | Modic | 428/145 |
| 4,581,281 | 4/1986 | Gerace | 428/215 |
| 4,593,068 | 6/1986 | Hirose et al. | 525/100 |
| 4,665,127 | 5/1987 | Hirose et al. | 525/100 |
| 4,693,935 | 9/1987 | Mazurek | 428/352 |

FOREIGN PATENT DOCUMENTS 29831 3/1977 Japan .
03477 6/1987 PCT Int'l Appl. .

Primary Examiner—Melvyn I. Marquis
Attorney, Agent, or Firm—Alexander Weitz

[57] ABSTRACT

The invention relates to a method of contacting two components to form a pressure-sensitive adhesive (PSA) construction, wherein the first component comprises a conventional PSA and a liquid organohydrogenpolysiloxane and the second component comprises the same PSA and a cure agent for the liquid organohydrogenpolysiloxane. The method provides improved adhesive bond strength over the unmodified PSA, which bond strength generally increases with the passage of time.

30 Claims, No Drawings

CROSSLINKABLE PRESSURE-SENSITIVE ADHESIVES CONTAINING A LIQUID ORGANOHYDROGENPOLYSILOXANE

The present invention relates to crosslinkable pressure-sensitive adhesives and an improved method for forming a pressure-sensitive adhesive construction. More particularly, the present invention relates to a method of contacting two distinct components to form the pressure-sensitive adhesive construction, wherein a liquid organohydrogenpolysiloxane is incorporated in the first component and a cure agent for the liquid organohydrogenpolysiloxane is incorporated in the second component.

BACKGROUND OF THE INVENTION

It is well known in the adhesives art that significant improvement in adhesion to various substrates can be obtained by incorporating various adhesion promoters into adhesive compositions or employing such adhesion promoters in primer compositions for coating the substrate. Development of a wide-ranging adhesives art has benefited from this method of adhesion improvement and various organosilanes have been typically employed as the adhesion promoter.

Organosilanes which are useful in these applications generally contain hydrolyzable groups (e.g., halogen, alkoxy) attached to the silicon atom thereof which generate silanol groups upon contact with ambient moisture, and thus readily form chemical and/or physical bonds with mineral and metal surfaces. Also attached to the silicon of the organosilane adhesion promoter is an organic moiety which is reactive with, or at least shows some affinity towards, one of the components of the adhesive (usually the polymer). This latter requirement usually limits the practical utility of a specific organosilane to particular adhesive-substrate combinations. In this way, a chemical or physical "molecular bridge" is believed to be formed between the adhesive and the substrate which results in the observed macroscopic improvement in adhesion.

Thus, for example, U.S. Pat. No. 3,644,245 to Flanagan et al. discloses hot melt adhesive compositions having improved adhesion under conditions of high humidity. These compositions comprise a synthetic polymer base and hydrolyzable silanes containing such organic groups as phenyl, vinyl, epoxy, mercapto, amino, ethyl, methyl and methacryloxypropyl.

Additionally, the adhesion to a substrate, as well as the cohesive strength of an adhesive composition, may be augmented by at least partially cross-linking the adhesive. Various examples of this method exist in the art, which method is illustrated by U.S. Pat. No. 3,657,379 to Hilbelink et al. This disclosure teaches adhesive systems comprising separated reactive components wherein (1) a first reactive polymer is mixed with a curing agent for a second reactive polymer to yield one component and (2) a second reactive polymer is mixed with a curing agent for the first reactive polymer to form another component. When the reactive materials from the two components are mixed, the curing agents react with their respective reactive polymers to give strong adhesive bonds.

A distinct category of adhesives which generally comprises natural or synthetic rubbers and resin tackifiers is known in the art as "pressure-sensitive adhesives" (PSAs). PSAs uniquely maintain a permanent "tack" which provides a bond of measurable strength immediately upon contact with another surface. Again, adhesion to a substrate, as well as the cohesive strength of the PSA composition itself, can be improved by curing the PSA.

A cured PSA based on a polyether having at least one silicon-containing hydrolyzable group in its molecule is disclosed by Hirose et al. in U.S. Pat. No. 4,463,115. This composition also contains a tackifier and, optionally, a silanol condensation catalyst for accelerating the curing reaction. It is stated that the resulting PSA has good adhesive properties and can be prepared substantially without the use of a solvent.

In a subsequent U.S. Pat. No. 4,665,127, Hirose et al. extended the above concept to include a wide variety of polymers having at least one reactive silicon-containing group combined with an organic aluminum or organic zirconium catalyst. These PSA compositions are said to have excellent heat resistance and releasability from substrates such as a silicone-coated release paper.

In U.S. Pat. No. 3,707,518, Bemmels et al. disclose a self cross-linking pressure-sensitive acrylate adhesive and tape which comprises a copolymer that includes a small amount of an alkoxy silyl polymerizable crosslinking monomer. Also included in these compositions is 2-6 parts by weight of an acid monomer which acts as a built-in catalyst and causes the adhesive copolymer to cure at ordinary temperatures.

Aside from silicone-based PSAs, the use of silanes as adhesion promoters or compositions wherein reactive silicon groups are chemically attached to organic molecules to promote cure therebetween, silicones are generally known in the art to be adhesive materials (i.e., they impart good release of adhesives) and have, indeed, been widely employed in release liners for pressure-sensitive tape. Surprisingly, as disclosed in a copending application entitled "Crosslikable Pressure-Sensitive Adhesives Containing a Liquid Copolymeric Organopolysiloxane," Ser. No. 181,763, filed on Apr. 14, 1988, Blizzard and Swihart discovered a method for contacting two components to form a pressure-sensitive adhesive (PSA) construction, wherein the first component comprises a conventional PSA and a liquid copolymeric organopolysiloxane and the second component comprises the PSA and a cure agent for the liquid copolymeric organopolysiloxane. The method provides improved adhesion, which generally increases with the passage of time, over the unmodified PSA.

SUMMARY OF THE INVENTION

It has now been further discovered that certain liquid organohydrogenpolysiloxanes may also be employed according to the methods described by Blizzard and Swihart, cited supra. Again, the augmented adhesion provided by the compositions of the present invention has been found to increase with time, contra the case wherein only silanes of the prior art, or cure agents alone, are incorporated in pressure-sensitive adhesive compositions. The present invention, therefore, relates to a method for forming a crosslinkable pressure-sensitive adhesive construction comprising:

contacting a first component comprising (I) a pressure-sensitive adhesive; and (II) a liquid organohydrogenpolysiloxane having an average of at least two silicon-bonded hydrogen atoms per molecule, with a second component comprising (III) said pressure-sensitive adhesive; and (IV) a cure agent for said liquid organohydrogenpolysiloxane.

This invention further relates to a composition comprising the pressure-sensitive adhesive and the liquid organohydrogenpolysiloxane employed in the above described method.

DETAILED DESCRIPTION OF THE INVENTION

In the method of the present invention, a first component comprising a pressure-sensitive adhesive (PSA) (I) and a liquid organohydrogenpolysiloxane (II) is contacted with a second component comprising the same pressure-sensitive adhesive, (III) and a cure agent for the liquid organohydrogenpolysiloxane (IV) to form a PSA construction. While not wishing to be bound by any particular mechanism, it is believed that after the PSA construction is formed the cure agent interacts with the liquid organohydrogenpolysiloxane to provide a "permanent set" to the adhesive system. Permanent set, as used herein, refers to the irreversible increase with time of the adhesive bond between the first and second components. This interaction can, of course, be hastened at elevated temperatures. The individual components, however, may generally be stored for prolonged periods under ambient conditions as long as they are not in contact with each other.

As far as is known, the exact nature of the pressure-sensitive adhesive (I) employed in the method and composition of the present invention is not critical to operability. The only limitation to this general operability is that the PSA have a reasonable degree of compatibility with the liquid organohydrogenpolysiloxane (II) and the cure agent (IV), each described infra. By compatibility it is meant that the PSA components are not subject to phase separation upon standing and remain as homogeneous dispersions or solutions. Thus, it is believed that any of the PSAs known in the art will function satisfactorily herein. These PSAs are generally based on a natural or synthetic rubber which has been mixed with a tackifier resin and, optionally, with various fillers, plasticizers, extender oils, catalysts, preservatives, antioxidants, stabilizers, or other ingredient normally employed in the preparation of PSAs. The PSAs suitable for use in the methods and compositions of the present invention may be based on natural rubber and/or one or more synthetic rubber such as butyl, silicone, acrylic, styrene-butadiene, acrylonitrile-butadiene, polyisobutylene, isoprene, isoprene-isobutylene, chloroprene, polyvinylether, chlorinated and polyurethane rubbers, and the like. Typical resin tackifiers used in conjunction with these rubbers include rosin, hydrocarbon resins, terpene resin, siloxane resin and the like. Particularly preferred PSAs include those based on styrene-butadiene, butyl and acrylic polymers.

The pressure-sensitive adhesives of ingredient (I) are well known in the art and further description thereof is considered unnecessary. Many of these materials are available commercially.

The liquid organohydrogenpolysiloxane (II) of this invention contains an average of at least 2, and preferably at least 3, silicon-bonded hydrogen atoms per molecule, and can have a linear, cyclic or branched structure or combinations thereof. Thus, ingredient (II) has the unit formula $R_mH_nSiO_{(4-m-n)/2}$ wherein m and n denote positive numbers whose sum is less than 4, preferably from 1.9 to 2.1. Each R of ingredient (II) denotes a monovalent hydrocarbon radical, such as an alkyl radical, such as methyl, ethyl, isopropyl, butyl and hexyl; an alkenyl radical, such as vinyl and allyl; an aryl radical, such as phenyl, tolyl and xylyl; and arylalkyl radical, such as beta-phenylethyl and beta-phenylpropyl; or a cycloaliphatic radical, such as cyclopentyl, and cyclohexyl. Preferably all R radicals in ingredient (II) are lower alkyl radicals although a minor portion of them can be replaced with other monovalent hydrocarbon radicals such as the vinyl radical and/or the phenyl radical. It is preferred that all the R radicals of the liquid organohydrogen-polysiloxane are methyl radicals, also designated herein as Me.

The liquid organohydrogenpolysiloxane of the present invention may be selected from cyclic organohydrogenpolysiloxanes having the unit formula $R_mH_{2-m}SiO$, such as $[(CH_3)(H)SiO]_x$, wherein x is 3, 4, 5, 6 and higher, and $[(CH_3)(H)SiO]_y[(CH_3)_2SiO]_z$ wherein y is at least 2 and the sum of y plus z is 3, 4, 5, 6 and higher. Preferably, it is a linear compound having the general formula $R'R_2SiO(R_2SiO)_a(RHSiO)_bSiR_2R'$, wherein R' denotes H or the above described hydrocarbon radical R, a has an average value of about 3 to 300 and b can be between about 2 and 200, provided there are at least 2 silicon-bonded hydrogen radicals per molecule.

Examples of preferred liquid organohydrogenpolysiloxane structures include

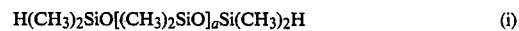

$H(CH_3)_2SiO[(CH_3)_2SiO]_aSi(CH_3)_2H$     (i)

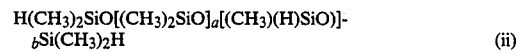

$H(CH_3)_2SiO[(CH_3)_2SiO]_a[(CH_3)(H)SiO]_bSi(CH_3)_2H$     (ii)

$(CH_3)_3SiO[(CH_3)(H)SiO]_bSi(CH_3)_3$     (iii)

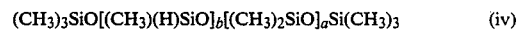

$(CH_3)_3SiO[(CH_3)(H)SiO]_b[(CH_3)_2SiO]_aSi(CH_3)_3$     (iv)

Formula (iii), in which b is between about 30 and 70, and formula (iv), in which a is about 3 to 150 and b is about 5 to 20, are highly preferred structures.

The liquid organohydrogenpolysiloxanes of the present invention are well known in the art and many of these fluids are available commercially.

Ingredient (III) of the present invention is the same PSA as ingredient (I).

The cure agent (IV) for the liquid organohydrogenpolysiloxane may be selected from any of the compounds which are known to facilitate the condensation reactions between SiH groups in the presence of trace quantities of water. For example, the compounds contemplated may be metal salts of carboxylic acids. Metals such as Pb, Zn, Sb, Fe, Cd, Sn, Ba, Ca and Mn are known to be effective in this regard, particularly the naphthanates, octoates, hexoates, laurates and acetates. Preferred salts are dibutyltin diacetate, dibutyltin dilaurate and stannous octoate, particularly the dibutyltin diacetate. These catalysts, and their use in promoting the above-mentioned reaction, are well known in the art.

The cure agent may also be selected from active metal catalysts such as platinum and rhodium compounds. Platinum catalysts such as platinum acetylacetonate or chloroplatinic acid are representative of these compounds and suitable for use as the cure agent (IV). Again, such compounds, and their utility in promoting the above reaction, are well known in the art. A preferred cure agent of this type is a mixture of a chloroplatinic acid complex of divinyltetramethyldisiloxane diluted in dimethylvinylsiloxy endblocked polydimethylsiloxane which may be prepared according to methods described by Willing in U.S. Pat. No. 3,419,593. Most preferably, this mixture contains about 0.65 weight percent platinum. When the cure agent (IV) is a platinum complex, it is further preferred that this ingredient also contain a methylvinyl-functional siloxane, such as methylvinylcyclosiloxane or a dimethyl-methylvinyl polysiloxane copolymer, having at least two vinyl groups per molecule.

Cure agent (IV) can also comprise an aminofunctional silane having the general formula

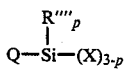

wherein Q is the group

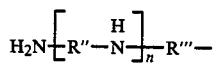

In the above formulas, R" represents a divalent hydrocarbon radical having 2 to 4 carbon atoms such as ethylene, trimethylene or tetramethylene. R''' is a divalent hydrocarbon radical having 3 to 6 carbon atoms, including such groups as trimethylene, tetramethylene, methyltrimethylene, pentamethylene and hexamethylene. The organic group R'''' may be selected from the group consisting of the methyl, ethyl, propyl, butyl and phenyl radical. The hydrolyzable species X may be selected from methoxy, ethoxy, acetoxy or chlorine groups. Finally, n is an integer between zero and two, inclusive, and p is zero or one. Preferred aminofunctional silanes are N-gamma-aminopropyltriethoxysilane, N-beta-aminoethyl-gamma-amino-isobutyltrimethoxysilane and N-beta-aminoethyl-gamma-aminopropyltrimethoxysilane, the latter being most preferred. These aminofunctional silanes may be combined with up to about 90 weight percent of organosilanes having the general formula RSiX₃ wherein R and X have the above defined meanings. Preferred R groups are selected from methyl, ethyl or phenyl radicals and preferred X groups are methoxy groups. Thus, an example of such a combination is a mixture consisting of 10% by weight of N-beta-aminoethyl-gamma-aminopropyltrimethoxysilane and 90% by weight of phenyltrimethoxysilane. When these cure agents bearing the hydrolyzable group X are employed in the second component of the present invention, this component must be stored in a dry environment until it is used. In use, the X group is hydrolyzed by ambient moisture.

Amine-functional silicones may also be employed as the cure agent and have the average general formula

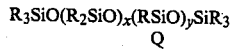

wherein R and Q have their previously defined meanings, x is about 50 to 450 and y is 1 to about 50. It is preferred that all the R groups be methyl. An example of such a preferred amine-functional silicone is represented by the formula

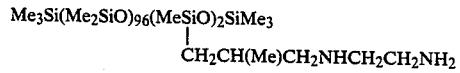

wherein Me denotes a methyl radical.

Cure agent (IV) may also be selected from primary, secondary or tertiary organic amines. Preferred amines are alkyl or aryl amines wherein the alkyl groups contain from 1 to 6 carbon atoms and wherein the aryl group is a phenyl radical. Specific examples of amines useful in the present invention are ethylamine, methylamine, phenylamine, diethylamine, dimethylamine, dibutylamine, diphenylethylamine, phenylmethylamine, butylamine, triethylamine, trimethylamine and tripropylamine. For the purposes of the present invention, diethylamine and triethylamine are most preferred.

The amine-functional silanes and siloxanes, as well as the organic amines, are all well known in the art and further descriptions thereof are considered unnecessary.

The compositions of this invention can further comprise typical adjuvants employed in the preparation of pressure sensitive adhesives, such as catalysts, fillers, pigments, dyes, fungicides, bacteriocides, stabilizers, antioxidants and cure-control additives, if desired.

In order to practice the present invention, the first component of this invention is prepared by thoroughly mixing, on a solids basis, from about 0.5 to 25 parts by weight, preferably from about 3 to 10 parts, of the liquid organohydrogenpolysiloxane (II) with 100 parts of the PSA (I). The compositions of the present invention, in which the liquid organohydrogenpolysiloxane (II) is incorporated in a PSA (I), are thus employed as an intermediate in the method of the invention. In a similar manner, the second component of this invention is prepared by thoroughly mixing a curing amount of the cure agent (IV) with 100 parts of the PSA (III). By "curing amount" it is meant at least an amount sufficient to improve the adhesion between the two components as demonstrated by an increase in bond strength and/or increased cohesive failure versus the unmodified PSA. Thus, the amount of cure agent employed will vary according to the nature of the PSA, amount of the liquid organohydrogenpolysiloxane incorporated therein and the particular cure agent selected. Those skilled in the art will readily arrive at optimum formulations by routine experimentation. For example, when the PSA is selected from the preferred systems based on acrylic, butyl or styrene-butadiene rubber, from about 0.25 to 10 parts by weight of the preferred cure agent dibutyltin diacetate are effectively employed per 100 parts by weight of the PSA solids, from about 1 to 3 parts of the dibutyltin diacetate being particularly preferred. Likewise, when the cure agent is the preferred chloroplatinic acid complex of divinyltetramethyldisiloxane diluted in dimethylvinylsiloxy endblocked polydimethylsiloxane recited supra, it is advantageously employed so as to provide from about 1 to 500 ppm (parts per million by weight) of platinum metal to the second component, from 10 to 100 ppm being most preferred in such compositions.

As mentioned above, however, the maximum liquid organohydrogenpolysiloxane content in the first component is limited by compatibility considerations and this ingredient must not separate from the PSA matrix to form its own macroscopic phase. It is, of course, recognized that separate phases may exist at a microscopic level.

As will be readily recognized by those skilled in the art, the PSAs of the present invention may be supplied as a solution or dispersion in an inert organic solvent or as a water-borne dispersion. By inert it is meant that the solvent does not react with any of the other ingredients of the present invention. The particular solvent selected will generally depend upon the PSA employed. Thus, for a non-polar PSA such as a silicone or a butyl rubber, a non-polar solvent such as toluene, hexane, cyclohexane, mineral spirits or xylene would be appropriate. For a polar PSA such as a urethane or acrylonitrile, a polar solvent such as acetone, ethyl acetate, tetrahydrofuran or dimethylformamide might be used. When the PSA is supplied as a water-based emulsion, various surfactants are included to maintain a homogeneous dispersion of the liquid and solid ingredients thereof. In general, the PSAs contemplated in the present invention are prepared and marketed in such solvent or water dispersion form and are well known in the art.

Likewise, the liquid organohydrogenpolysiloxane (II) and the cure agent (IV) may be supplied in an organic solvent or as a water-based emulsion for combination with similarly dissolved or dispersed PSA. Again, when water-based emulsions of these ingredients are employed, surfactants are added to maintain a homogeneous dispersion.

Any conventional mixing method may be used to mix the ingredients of the above described components. For example, when the PSA is supplied in solution or emulsion form, relatively low shear mixers such as low speed blade mixers or Pfaudlers may be used. When an all-solids PSA is to be used according to the methods of the present invention, a high intensity mixer, such as a Banbury or roll mill, should be used to insure good dispersion of the ingredients. As far as is known, the order of mixing is not critical to the operability of this invention as long as the liquid organohydrogenpolysiloxane and the cure agent therefor are thoroughly dispersed in the respective PSA compositions.

After the above described first and second components are prepared, said components are contacted in the method of this invention to form a pressure-sensitive adhesive construction. Ordinarily, each component is coated onto a substrate before the contacting step is executed. Thus, this well known method in the art can be practiced using the components disclosed herein by first coating a backer, such as a plastic or metallic film or tape, with the first component of this invention and contacting the resulting composite with the surface of a solid substrate, such as a metal or plastic, which was previously coated with the second component of the present invention. It is also contemplated that a free film of the first and second components of the present invention may be prepared by coating each component onto a release liner as is commonly practiced in the art in certain bonding operations.

To form such coatings on substrates, solvent-based compositions of this invention can be diluted with a sufficient quantity of a good solvent for the respective components in order to provide a desired coating consistency. As described above, such solvents as hexane, heptane, toluene, xylene, mineral spirits or ketones are suitable for this purpose, the exact choice being based on the nature of the PSAs involved, as is commonly practiced in the art. In the case of water-borne systems, water could be used to adjust the consistency. Coatings of such solvent-based or water-based first and second components may be applied to substrates by any of the methods commonly practiced in the coating arts. For example, they may be dipped, brushed, flow coated, blade coated or gravure coated onto a substrate. After coating the backer or solid substrate with the PSA composition, solvent (or water) is generally removed by evaporation at ambient temperature or by heating, as commonly practiced in the art. Alternatively, 100% solids coatings are also contemplated herein. These may be applied to a substrate by, e.g., a calendaring operation or one of the above mentioned techniques if the viscosity is low enough.

Those skilled in the art will readily recognize that the constructions of the present invention may be used in many of the applications currently being served by the PSAs described above (i.e., ingredient I of the present invention). With the constructions of the present invention, however, the adhesion is improved and, with the passage of time, the adhesive bond formed between the first and second components will generally increase in strength. This permanent set aspect of the present invention is, of course, an advantage in many applications wherein a strong bond, rather than reversibility thereof, is of primary importance. Such applications include bonding of automotive and decorative trim, permanent fastening devices such as picture hooks, contact paper and labels, electronic component assembly, substrate lamination (e.g., metals, paper, plastic, floor tiles, carpeting), and the like.

EXAMPLES

The following examples are presented to further illustrate the compositions and methods of this invention, but are not to be construed as limiting the invention, which is delineated in the appended claims. All parts and percentages in the examples are on a weight basis and all are reported on a solids basis unless indicated to the contrary.

The following ingredients were used to prepare the compositions of this invention.

FLUID A—A liquid organohydrogenpolysiloxane having the average formula $$Me_3SiO(MeSiO)_{35}SiMe_3$$
$$H$$

wherein Me herein denotes a methyl radical.

FLUID B—A liquid organohydrogenpolysiloxane having the average formula $$Me_3SiO(MeHSiO)_{19.3}(Me_2SiO)_{144}SiMe_3$$

FLUID C—A liquid organohydrogenpolysiloxane having the average formula $$Me_3SiO(MeHSiO)_{9.2}(Me_2SiO)_{100}SiMe_3$$

FLUID D—A liquid organohydrogenpolysiloxane having the average formula $$Me_3SiO(MeHSiO)_5(Me_2SiO)_3SiMe_3$$

FLUID E—A polydimethylsiloxane copolymer having the average structure $$Me_3Si(Me_2SiO)_{96}(MeSiO)_2SiMe_3$$
$$|$$
$$CH_2CH(Me)CH_2NHCH_2CH_2NH_2$$

FLUID F—Methylvinylcyclosiloxane having the structure (MeViSiO)n wherein Vi herein denotes a vinyl group and n varies from 3 to about 7.

FLUID G—A dimethyl-methylvinyl polysiloxane copolymer having the average structure ViMe$_2$SiO(Me$_2$SiO)$_{96}$(MeViSiO)$_2$SiMe$_2$Vi PT—Chloroplatinic acid complex of divinyltetramethyldisiloxane diluted with dimethylvinylsiloxy endblocked polydimethylsiloxane to provide about 0.65 weight percent platinum; prepared according to Example 1 of U.S. Pat. No. 3,419,593 to Willing.
DBTDA—Dibutyltin diacetate.

EXAMPLES 1-5

An acrylic pressure-sensitive adhesive (PSA) solution, GELVA MS 263, was modified to form the constructions of the present invention. GELVA MS 263 (Monsanto Co., St. Louis, MO) is described as a 45% solids solution of an acrylic copolymer in ethyl acetate and hexane. A first component was prepared by thoroughly mixing FLUID A with this PSA, as indicated in Table 1. A second component was prepared by thoroughly mixing the DBTDA (tin cure agent) with the PSA, again as indicated in Table 1. Each of these components was then applied to 5 mil aluminum foil, dried to form a 2 mil-thick film thereon and the coated foil was cut into 1 inch-wide strips. The foil strips bearing the first and second PSA adhesive films were pressed together at room temperature to form a lap joint having a 1 inch overlap (i.e., a total of 1 square inch contact surface). The same procedure was followed in the preparation of (Comparative) Example 1, which served as a control and contained no additives in either PSA layer. The lap joints were aged at room temperature for various periods and then tested (at room temperature using a pull rate of ½ inch/minute) to determine shear adhesive strength. Results are presented in Table 1.

TABLE 1

|  | (Comparative) Example 1 | Ex. 2 | Ex. 3 | Ex. 4 | Ex. 5 |
|---|---|---|---|---|---|
| % FLUID A in first component (solids basis) | — | 1.0 | 1.0 | 10 | 10 |
| % DBTDA in second component (solids basis) | — | 3.0 | 5.0 | 3.0 | 5.0 |
| Shear Adhesion (lb) |  |  |  |  |  |
| After: 1 hour | 32 | 14 | 74 | 53 | 59 |
| 1 day | 41 | 31 | 73 | 71 | 75 |
| 2 days | 38 | 32 | 83 | 74 | 76 |
| 7 days | 41 | 54 | 85* | 74 | 74 |
| 28 days | 29 | 63 | 86 | 63 | 72 |

*Aluminum foil tore; actual shear strength greater than indicated.

It is seen from Table 1 that the PSA constructions of the present invention provide improved shear adhesive strength versus an unmodified acrylic system. It may be further noted that this strength generally increased with the passage of time.

EXAMPLES 6-11

The acrylic PSA of Examples 1-5 was modified in a similar manner using the amine-functional FLUID E as the cure agent in the second component. Shear adhesion results, determined as in the previous examples, appear in Table 2.

TABLE 2

|  | Ex. 6 | Ex. 7 | (Comp.) Ex. 8 | Ex. 9 | Ex. 10 | Ex. 11 |
|---|---|---|---|---|---|---|
| % FLUID A in first component (solids basis) | 1.0 | 1.0 | 1.0 | 10 | 10 | 10 |
| % FLUID E in second component (solids basis) | 0.1 | 1.0 | 5.0 | 0.1 | 1.0 | 5.0 |
| Shear Adhesion (lb) |  |  |  |  |  |  |
| After: 1 hour | 37 | 11 | 17 | 41 | 89 | 67 |
| 1 day | 36 | 23 | 95 | 50 | 83 | 79 |
| 2 days | 54 | 18 | 43 | 44 | 85* | 86 |
| 7 days | 62 | 27 | 30 | 46 | 89* | 89 |
| 28 days | 59 | 75 | 27 | 61 | 89 | 75 |

*Aluminum foil tore; actual shear strength greater than indicated.

EXAMPLES 12-14

The acrylic PSA of Examples 1-5 was modified in a similar manner using FLUID B in the first component and either the DBTDA or the amine-functional FLUID E as the cure agent in the second component. Shear adhesion results, determined as in the previous examples, appear in Table 3.

TABLE 3

|  | (Comparative) Example 12 | Ex. 13 | Ex. 14 |
|---|---|---|---|
| % FLUID B in first component (solids basis) | 10 | 10 | 10 |
| % DBTDA in second component (solids basis) | — | 5.0 | — |
| % FLUID E in second component (solids basis) | — | — | 1.0 |
| Shear Adhesion (lb) |  |  |  |
| After: 1 hour | 10 | 15 | 34 |
| 1 day | 10 | 14 | 35 |
| 2 days | 3 | 35 | 40 |
| 7 days | 33 | 85 | 51 |
| 28 days | 9 | 87 | 81 |

EXAMPLES 15-17

The acrylic PSA of Examples 1-5 was modified in a similar manner using FLUID C in the first component and either the DBTDA or the amine-functional FLUID E as the cure agent in the second component. Shear adhesion results, determined as in the previous examples, appear in Table 4.

TABLE 4

|  | (Comparative) Example 15 | Ex. 16 | Ex. 17 |
|---|---|---|---|
| % FLUID C in first component (solids basis) | 10 | 10 | 10 |
| % DBTDA in second component (solids basis) | — | 5.0 | — |
| % FLUID E in second component (solids basis) | — | — | 1.0 |
| Shear Adhesion (lb) |  |  |  |
| After: 1 hour | 35 | 71 | 4 |
| 1 day | 31 | 88* | 64 |
| 2 days | 35 | 85* | 69 |
| 7 days | 38 | 83* | 84 |
| 28 days | 32 | 76 | 82* |

*Aluminum foil tore; actual shear strength greater than indicated.

EXAMPLES 18-20

The acrylic PSA of Examples 1-5 was modified in a similar manner using FLUID D in the first component and either the DBTDA or the amine-functional FLUID E as the cure agent in the second component. Shear adhesion results, determined as in the previous examples, appear in Table 5.

TABLE 5

|  | (Comparative) Example 18 | Ex. 19 | Ex. 20 |
| --- | --- | --- | --- |
| % FLUID D in first component (solids basis) | 10 | 10 | 10 |
| % DBTDA in second component (solids basis) | — | 5.0 | — |
| % FLUID E in second component (solids basis) | — | — | 1.0 |
| Shear Adhesion (lb) |  |  |  |
| After: 1 hour | 44 | 92* | 47 |
| 1 day | 51 | 90* | 48 |
| 2 days | 42 | 92* | 84 |
| 7 days | 45 | 90* | 73 |
| 28 days | — | — | — |

*aluminum foil tore; actual shear strength greater than indicated.

As before, all the compositions of the present invention resulted in improved shear adhesion relative to the control acrylic PSA (Comparison Example 1). It will be noted, however, that the beneficial effects of the modifications taught herein were destroyed by incorporating excessive amounts of cure agent, as demonstrated by (Comparative) Example 8.

EXAMPLES 21-27

A styrene-butadiene rubber based PSA solution, DURO-TAK 36-6045, was modified and tested according to the procedures outlined in Examples 1-5, above. DURO-TAK 36-6045 (National Starch and Chemical Corp., Bridgewater, NJ) is described as a 48% solids solution in toluene, heptane and isopropyl alcohol having a viscosity of about 5,500 cP. FLUID A was used to modify the first component and either the DBTDA or the amine-functional FLUID E served as the cure agent in the second component. Shear adhesion results are shown in Table 6.

EXAMPLES 28-33

The styrene-butadiene rubber PSA used in Examples 21-27 was modified by incorporating either FLUID B or FLUID C in the first component and either the DBTDA or FLUID E in the second component, as described above and indicated in Table 7. Shear adhesion testing results are also reported in Table 7.

TABLE 7

|  | (Comp.) Ex. 28 | Ex. 29 | Ex. 30 | (Comp.) Ex. 31 | Ex. 32 | Ex. 33 |
| --- | --- | --- | --- | --- | --- | --- |
| % FLUID B in first component (solids basis) | 10 | 10 | 10 | — | — | — |
| % FLUID C in first component (solids basis) | — | — | — | 10 | 10 | 10 |
| % DBTDA in second component (solids basis) | — | 5.0 | — | — | 5.0 | — |
| % FLUID E in second component (solids basis) | — | — | 1.0 | — | — | 1.0 |
| Shear Adhesion (lb) |  |  |  |  |  |  |
| After: 1 hour | 2 | 6 | 6 | 0.5 | 31 | 8 |
| 1 day | 3 | 65 | 10 | 2 | 33 | 10 |
| 2 days | 4 | 88* | 11 | 9 | 35 | 43 |
| 7 days | 4 | 81* | 16 | 11 | 76 | 66 |
| 28 days | 10 | 85 | 41 | 14 | 90 | 80 |

*aluminum foil tore; actual shear strength greater than indicated.

EXAMPLES 34-35

The styrene-butadiene rubber PSA used in Examples 21-27 was modified by incorporating FLUID A in the first component and a platinum catalyst (PT) as well as a methylvinyl siloxane cure accelerator (i.e., FLUID F or FLUID G) in the second component. Shear adhesion results are presented in Table 8, wherein (Comparative) Example 21 is included to highlight the improved adhesion attained by the present invention.

TABLE 8

|  | (Comparative) Example 21 | Ex. 34 | Ex. 35 |
| --- | --- | --- | --- |
| % FLUID A in first component (solids basis) | — | 10 | 10 |
| % PT in second component (solids basis) | — | 0.05 | 0.05 |
| % FLUID F in second component | — | 5.0 | — |

TABLE 6

|  | (Comp.) Ex. 21 | (Comp.) Ex. 22 | Ex. 23 | Ex. 24 | Ex. 25 | Ex. 26 | Ex. 27 |
| --- | --- | --- | --- | --- | --- | --- | --- |
| % FLUID A in first component (solids basis) | — | 10 | 10 | 10 | 10 | 10 | 10 |
| % DBTDA in second component (solids basis) | — | — | 3.0 | 5.0 | — | — | — |
| % FLUID E in second component (solids basis) | — | — | — | — | 0.1 | 1.0 | 5.0 |
| Shear Adhesion (lb) |  |  |  |  |  |  |  |
| After: 1 hour | 7 | 23 | 34 | 47 | 47 | 32 | 12 |
| 1 day | 10 | 40 | 46 | 47 | 45 | 41 | 25 |
| 2 days | 11 | 30 | 42 | 46 | 58 | 41 | 23 |
| 7 days | 9 | 35 | 49 | 52 | 44 | 42 | 24 |
| 28 days | 9 | 33 | 47 | 50 | 43 | 39 | 33 |

TABLE 8-continued

|  | (Comparative) Example 21 | Ex. 34 | Ex. 35 |
| --- | --- | --- | --- |
| (solids basis) | | | |
| % FLUID G in second component (solids basis) | — | — | 1.0 |
| Shear Adhesion (lb) | | | |
| After: 1 hour | 7 | 61 | 46 |
| 1 day | 10 | 50 | 58 |
| 2 days | 11 | 64 | 68 |
| 7 days | — | 59 | 69 |

EXAMPLES 36–37

The acrylic PSA of Examples 1–5 was modified by incorporating FLUID A in the first component and a platinum catalyst (PT) as well as a methylvinyl siloxane cure accelerator (i.e., FLUID F or FLUID G) in the second component. Shear adhesion results are presented in Table 9, wherein (Comparative) Example 1 is also included.

TABLE 9

|  | (Comparative) Example 1 | Ex. 36 | Ex. 37 |
| --- | --- | --- | --- |
| % FLUID A in first component (solids basis) | — | 10 | 10 |
| % PT in second component (solids basis) | — | 0.05 | 0.05 |
| % FLUID F in second component (solids basis) | — | 5.0 | — |
| % FLUID G in second component (solids basis) | — | — | 5.0 |
| Shear Adhesion (lb) | | | |
| After: 1 hour | 32 | 51 | 27 |
| 1 day | 41 | 22 | 40 |
| 2 days | 38 | 25 | 75 |
| 7 days | 41 | 49 | 79 |
| 28 days | 29 | — | — |

We claim:

1. A method for forming a crosslinkable pressure-sensitive adhesive construction comprising: contacting a first component comprising
   (I) a pressure-sensitive adhesive; and
   (II) a liquid organohydrogenpolysiloxane having an average of at least two silicon-bonded hydrogen atoms per molecule, with a second component comprising
   (III) said pressure-sensitive adhesive; and
   (IV) a cure agent for said liquid organohydrogenpolysiloxane.

2. The method of claim 1, wherein said pressure-sensitive adhesive is selected from those based on natural, butyl, acrylic, styrene-butadiene, acrylonitrile-butadiene, polyisobutylene, isoprene, isoprene-isobutylene, chloroprene, polyvinylether, chlorinated or polyurethane rubber.

3. The method of claim 1, wherein said liquid organohydrogenpolysiloxane (II) is selected from fluids having the average formula R'R$_2$SiO(R$_2$SiO)$_a$(RHSiO)$_b$SiR$_2$R', wherein R is a monovalent hydrocarbon radical, R' is H or R, a is about 3 to 300 and b is about 2 to 200.

4. The method of claim 3, wherein R and R' are methyl radicals.

5. The method of claim 1, wherein said liquid organohydrogenpolysiloxane (II) is selected from the average structure $(CH_3)_3SiO[(CH_3)(H)SiO]_bSi(CH_3)_3$, wherein b is about 30 to 70, or the average structure $(CH_3)_3SiO[(CH_3)(H)SiO]_b[(CH_3)_2SiO]_aSi(CH_3)_3$, wherein a is about 3 to 150 and b is about 5 to 20.

6. The method of claim 5, wherein said pressure-sensitive adhesive is selected from those based on butyl, acrylic or styrene-butadiene rubber.

7. The method of claim 1, wherein said cure agent comprises an amine-functional silane having the general formula $$Q-\underset{\underset{R''''_p}{|}}{Si}-(X)_{3-p}$$

wherein Q is the group $$H_2N-\left[R''-\underset{\underset{H}{|}}{N}\right]_n-R'''-$$

in which R'' represents a divalent hydrocarbon radical having 2 to 4 carbon atoms, R''' is a divalent hydrocarbon radical having 3 to 6 carbon atoms, R'''' is selected from methyl, ethyl, propyl, butyl or phenyl radicals, X is selected from methoxy, ethoxy, acetoxy or chlorine groups, n is an integer between zero and two, inclusive, and p is zero or one.

8. The method of claim 7 wherein said amine-functional silane comprises at least one silane selected from N-gamma-aminopropyltriethoxysilane or N-beta-aminoethyl-gamma-aminopropyltrimethoxysilane.

9. The method of claim 8, wherein said pressure-sensitive adhesive is selected from those based on acrylic, butyl or styrene-butadiene rubber.

10. The method of claim 9, wherein said cure agent contains up to about 90 weight percent of an organosilane having the general formula $$RSiX_3$$

in which R denotes a monovalent hydrocarbon radical and X is selected from methoxy, ethoxy, acetoxy or chlorine groups.

11. The method of claim 10, wherein said organosilane is phenyltrimethoxysilane.

12. The method of claim 1, wherein said cure agent is an amine-functional silicone having the average general formula $$R_3SiO(R_2SiO)_x(RSiO)_ySiR_3$$
$$\phantom{R_3SiO(R_2SiO)_x(}Q$$

wherein R denotes a monovalent hydrocarbon radical, x is about 50 to 450 and y is 1 to about 50, in which Q is the group $$H_2N-\left[R''-\underset{\underset{H}{|}}{N}\right]_n-R'''-$$

in which R'' represents a divalent hydrocarbon radical having 2 to 4 carbon atoms, R''' is a divalent hydrocarbon radical having 3 to 6 carbon atoms and n is an integer between zero and two, inclusive.

13. The method of claim 12, wherein R is a methyl radical.

14. The method of claim 13, wherein said pressure-sensitive adhesive is selected from those based on acrylic, butyl or styrene-butadiene rubber.

15. The method of claim 14, wherein x is about 96, y is 2 and Q is the group represented by the formula —$CH_2CH(Me)CH_2NHCH_2CH_2NH_2$ in which Me denotes a methyl radical.

16. The method of claim 1, wherein said cure agent is selected from primary, secondary or tertiary organic amines.

17. The method of claim 16, wherein said organic amine is selected from diethylamine or triethylamine.

18. The method of claim 1, wherein said cure agent is selected from dibutyltin diacetate, dibutyltin dilaurate or stannous octoate.

19. The method of claim 18, wherein said pressure-sensitive adhesive is selected from those based on acrylic, butyl or styrene-butadiene rubber.

20. The method of claim 1, wherein said cure agent is an active metal catalyst selected from platinum or rhodium compounds.

21. The method of claim 20, wherein said pressure-sensitive adhesive is selected from those based on acrylic, butyl or styrene-butadiene rubber.

22. The method of claim 21, wherein said platinum compound is a chloroplatinic acid complex of divinyltetramethyldisiloxane diluted in dimethylvinylsiloxy endblocked polydimethylsiloxane and containing about 0.65 weight percent of platinum.

23. The method of claim 6, wherein said liquid organohydrogenpolysiloxane is incorporated at about 0.5 to 25 parts by weight per 100 parts by weight of said pressure-sensitive adhesive and said cure agent is selected from amine-functional silanes, amine-functional siloxanes, organic amines, noble metal compounds or metal salts of carboxylic acids.

24. A composition comprising: (I) a pressure-sensitive adhesive selected from those based on natural, butyl, acrylic, styrene-butadiene, acrylonitrile-butadiene, polyisobutylene, isoprene, isoprene-isobutylene, chloroprene, polyvinylether, chlorinated or polyurethane rubber; and (II) from about 0.5 to 25 parts by weight per 100 parts by weight of said pressure-sensitive adhesive of a liquid organohydrogenpolysiloxane having an average of at least two silicon-bonded hydrogen atoms per molecule.

25. The composition of claim 24, wherein said liquid organohydrogenpolysiloxane (II) is selected from fluids having the average formula $R'R_2SiO(R_2SiO)_a(RHSiO)_bSiR_2R'$, wherein R is a monovalent hydrocarbon radical, R' is H or R, a is about 3 to 300 and b is about 2 to 200.

26. The composition of claim 25, wherein R and R' are methyl radicals.

27. The composition of claim 24, wherein said liquid organohydrogenpolysiloxane (II) is selected from the average structure $(CH_3)_3SiO[(CH_3)(H)SiO]_bSi(CH_3)_3$, wherein b is about 30 to 70 or the average structure $(CH_3)_3SiO[(CH_3)(H)SiO]_b[(CH_3)_2SiO]_aSi(CH_3)_3$, wherein a is about 3 to 150 and b is about 5 to 20.

28. The composition of claim 27, wherein said pressure-sensitive adhesive is selected from those based on butyl, acrylic or styrene-butadiene rubber.

29. The pressure-sensitive adhesive construction prepared by the method of claim 2.

30. The pressure-sensitive adhesive construction prepared by the method of claim 6.

* * * * *